United States Patent
Sanchis Estruch et al.

(10) Patent No.: US 10,052,894 B2
(45) Date of Patent: Aug. 21, 2018

(54) MEDIA HANDLING SYSTEM ASSEMBLY

(71) Applicants: HEWLETT-PACKARD DEVELOPMENT COMPANY, L.P., Houston, TX (US); Ricardo Sanchis Estruch, Barcelona (ES); Joaquim Brugue Garvi, Barcelona (ES); Pol Morral, Sant Cugat del Valles (ES)

(72) Inventors: Ricardo Sanchis Estruch, Barcelona (ES); Joaquim Brugue Garvi, Barcelona (ES); Pol Morral, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/312,631

(22) PCT Filed: Jun. 2, 2014

(86) PCT No.: PCT/EP2014/061338
§ 371 (c)(1),
(2) Date: Nov. 19, 2016

(87) PCT Pub. No.: WO2015/185084
PCT Pub. Date: Dec. 10, 2015

(65) Prior Publication Data
US 2017/0182816 A1    Jun. 29, 2017

(51) Int. Cl.
*B41J 2/01* (2006.01)
*B41J 29/02* (2006.01)
(Continued)

(52) U.S. Cl.
CPC .............. *B41J 29/02* (2013.01); *B41J 19/06* (2013.01); *F16M 11/22* (2013.01)

(58) Field of Classification Search
None
See application file for complete search history.

(56) References Cited

U.S. PATENT DOCUMENTS

| 4,108,297 A | 8/1978 | Durr et al. |
| 4,688,692 A | 8/1987 | Humbs et al. |

(Continued)

FOREIGN PATENT DOCUMENTS

| CN | 202782212 | 3/2013 |
| JP | H10 161507 A | 6/1998 |

(Continued)

OTHER PUBLICATIONS

Soler, et al., "Efficient Color Printer Characterization Based on Extended Neugebauer Spectral models", Retrieved on Nov. 22, 2016, 8 pages.

*Primary Examiner* — Erica Lin
(74) *Attorney, Agent, or Firm* — HP Inc. Patent Department (57) ABSTRACT

An assembly of a large format media handling system, including a planar longitudinal cross structure; and a support structure, the support structure including two side supports comprising a number of fixed references and at least one adjustable reference, wherein the side supports are supported by the longitudinal cross structure at said references; wherein the at least one adjustable reference is formed by a wedge element slidably attached to the support structure; and the side supports are fixed to the planar longitudinal cross structure wherein the cross structure is in contact with all of the references.

14 Claims, 7 Drawing Sheets

(51) Int. Cl.
*B41J 19/06* (2006.01)
*F16M 11/22* (2006.01)

(56) References Cited

U.S. PATENT DOCUMENTS

| | | |
|---|---|---|
| 5,441,589 A | 8/1995 | Groswith |
| 5,543,891 A | 8/1996 | Satorlyarna |
| 5,558,018 A | 9/1996 | Leinonen |
| 6,636,338 B1 | 10/2003 | Kida et al. |
| 6,786,144 B2 | 9/2004 | Williams |
| 7,128,302 B2 | 10/2006 | Dubensky |
| 7,997,196 B2 | 8/2011 | Whelan |
| 8,393,269 B2 | 3/2013 | Kummet |
| 2004/0060918 A1 | 4/2004 | Woodlief et al. |
| 2004/0134368 A1 | 7/2004 | Gottling et al. |
| 2007/0036528 A1 | 2/2007 | Okabe |
| 2007/0071498 A1 | 3/2007 | Ueda |
| 2007/0077087 A1 | 4/2007 | Okabe et al. |
| 2008/0007935 A1 | 1/2008 | Kondo et al. |
| 2008/0310879 A1 | 12/2008 | Kotsuka et al. |
| 2009/0092414 A1 | 4/2009 | Tomatsu |
| 2010/0028043 A1 | 2/2010 | Hashimoto et al. |
| 2010/0135694 A1 | 6/2010 | Hashimoto et al. |
| 2011/0318055 A1 | 12/2011 | Kato et al. |
| 2012/0195633 A1 | 8/2012 | Okabe |
| 2013/0264457 A1* | 10/2013 | Ueyama .................. F16M 13/02 248/674 |

FOREIGN PATENT DOCUMENTS

| | | |
|---|---|---|
| JP | 2004302194 | 10/2004 |
| JP | 2010 204354 A | 9/2010 |
| WO | 2013091915 | 6/2013 |

* cited by examiner

MEDIA HANDLING SYSTEM ASSEMBLY

Large format media handling systems, such as large format printers, scanners, folding and cutting machines, industrial printers and the like, include base support structures that provide structural stiffness to a compendium of sub-systems which might weigh several hundreds of kilogram and, at the same time, they provide dimensional accuracy to these sub-systems good enough to enable high resolution in processing the media, equivalent to that reached by e.g. table-top size printers and scanners. A large format printer may, for example, weigh about 500 kg and hence needs a supporting structure sufficiently strong to support and align all of the printer's sub-systems, such as a print platen, a printhead assembly, a print media transport system, a print media holder, a print media input section, a print media output section and the like. While the supporting structure needs to be strong enough to carry all the weight, it also has to be precisely aligned so that printing or otherwise processing a media can be performed with high resolution and accuracy.

Examples of this disclosure are now described with reference to the drawings in which.

In the following description, examples of an assembly of a large format media handling system and a method of providing the same are described with reference to the drawings. In the examples of the drawings, a large format printer is illustrated, using the assembly as a base support structure. The present disclosure is not limited to this example but can be used for any other large format media handling system, such as scanners, copying machines, industrial printers, offset printers, post-production machines and the like.

When, in the following description, reference is made to the relative orientation or movement of parts shown in the drawings, such as by using the terms "upper", "lower", "bottom", "top", "sideways" etc., the description refers to the orientation of said parts as shown in the respective drawing described.

In the examples described, the assembly comprises a planar longitudinal cross-structure, also referred to as base plate 10, and a support structure including two side supports, also referred to as side plates 12, 14. Instead of plates, a frame structure or other supporting structure could be used. For facilitating this description, the planar longitudinal cross-structure will be referred to as base plate 10, and the side supports will be referred to as side plates 12, 14, in the following examples. In the example described herein, the assembly eventually will serve as a base support structure for a large format media handling system, which will be referred to as large format printer in the following description, without implying any limitation of this disclosure to a printer. The base support structure provides a highly accurate mounting platform including precisely aligned mounting points for sub-structures of the large format printer and having high structural rigidity and support strength. Examples of sub-structures which can be supported by a mounting platform in a large format printer are a media handling sub-system, a media transport sub-system, a printing mechanism, a scanning mechanism, a media input section, a media output section and the like. The mounting platform provides structural stiffness to all of these sub-systems which may weigh up to many hundreds of kilograms and, at the same time, provides dimensional accuracy sufficient to allow a high resolution printing process and meet image quality (IQ) specifications. Longitudinal cross-structures carrying the sub-systems may introduce big dimensional tolerances from side to side of the machine which make longitudinal sub-systems hard to align to one another.

As described below, the assembly and method of this disclosure allow the base plate to copy an eight-point planar reference coming from well-positioned side plates, the side plates being positioned through an assembly jig. Aligning the base plate to the side plates is achieved by providing a number of fixed references and at least one adjustable reference on the side plates, positioning the base plate relative to the side plates such that the base plate contacts at least three of the fixed references on the side plates, adjusting the at least one adjustable reference so that the base plate contacts also the at least one adjustable reference on the side plates and then fixing the base plate to the side supports.

This is illustrated with reference to FIGS. 1 and 2A wherein the fixed references are shown schematically by fixed reference lines 16 and the adjustable references as shown schematically by dotted lines 18.

Figure 2A:
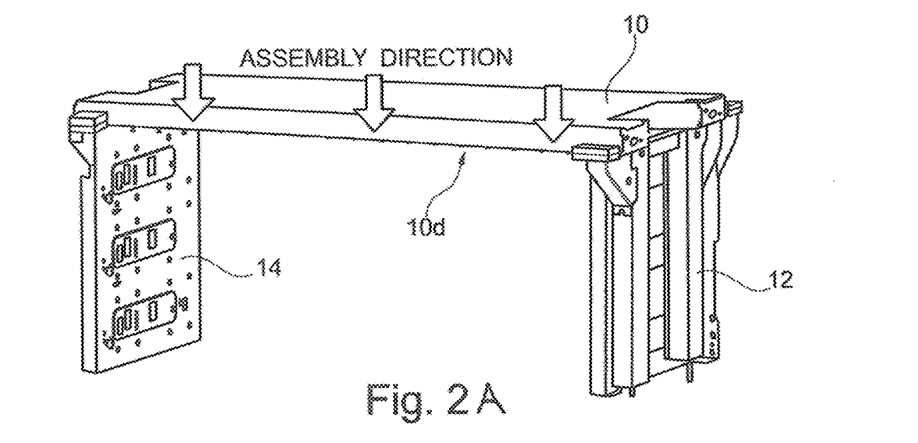
FIG. 2A shows the parts of FIG. 1, illustrating another step of an assembly process.
Figure 2B:
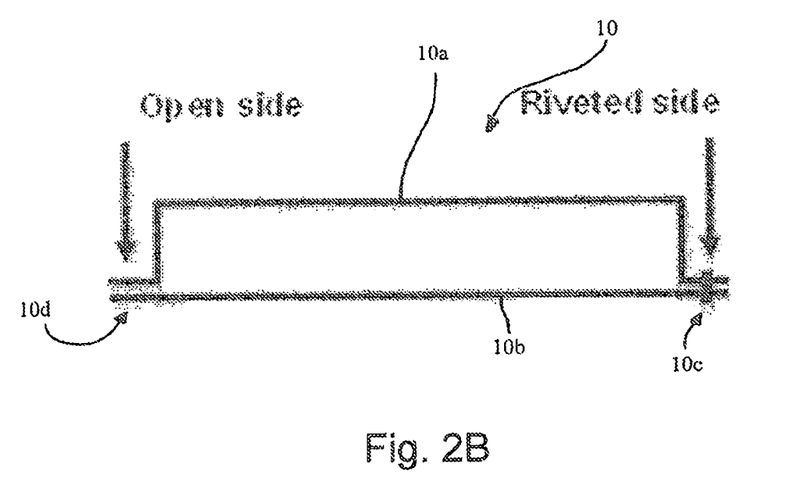
FIG. 2B schematically shows a cross section through a base plate.

In the example shown in the figures, the base plate 10 is a sheet metal part having a generally closed profile (which is initially open along one edge, before finishing the assembly process to achieve low torsional rigidity), shown schematically in FIG. 2B. It may be constructed from a U-shaped profile 10a and a flat sheet 10b which is closed along both longitudinal edges by any suitable fastening means, such as rivets, screws, welding or the like. The profile of the base plate may include additional reinforcement structures, such as ribs, longitudinal and transverse reinforcement beams or the like. During the assembly process, the profile of the base plate 10 initially is closed along only one of its longitudinal side edges 10c wherein the profile is open along the other longitudinal side edge 10d so that the base plate 10 has little torsional stiffness and provides a relatively "soft" body which allows some torsional movement during the mounting process in order to adapt/copy the references given by the lateral side plates.

Figure 1:
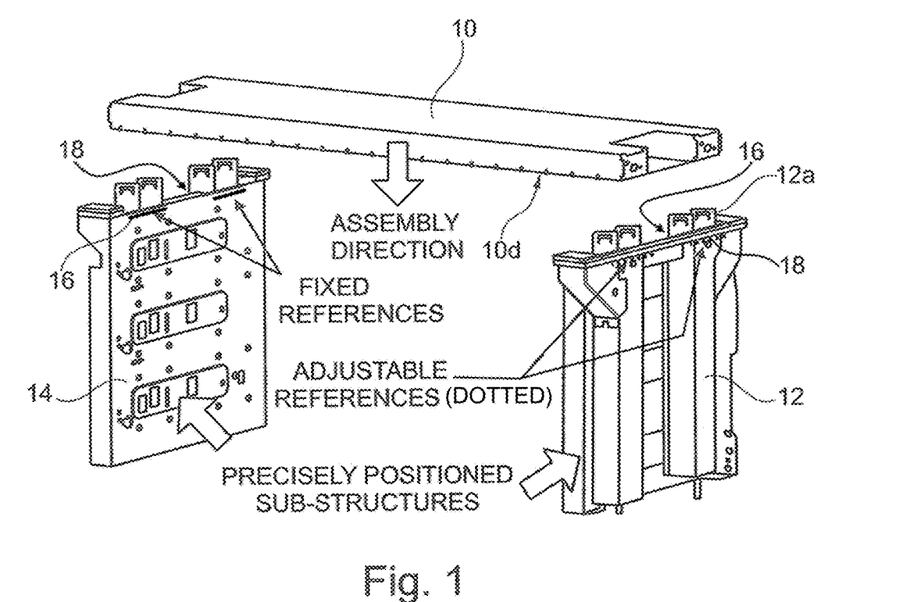
FIG. 1 shows an example of parts of a large format media handling system during assembly.

As shown in FIGS. 1 and 2A, the base plate 10 is positioned over the two lateral side plates 12, 14, thereby contacting three of the four fixed references 16 which, in the example described, are reference lines, which may be formed by sections of the upper and inner edges of the side plates in further detail below. After a three-point contact has been established, a small vertical force is applied to the top of the base plate 10, as suggested by the downwards facing arrows in FIG. 2A. The vertical force is just big enough to impart a small torsional movement to the base plate 10, the base plate, at that time, having very low torsional rigidity so that the base plate 10 comes into contact with all of the four fixed references 16 in order to copy the references. In the example shown in FIG. 1, each of the side plates 12, 14 provides two fixed references 16 which, under the presumption that the side plates 12 are perfectly positioned, using an assembly jig or the like, all lie within one horizontal plane. Once the base plate has been referenced to the fixed references 16 of the side plates 12, 14, there will be a defined gap between the base plate's lower contact surface and the four adjustable references 18, with two adjustable references at each side plate 12, 14. The adjustable references 18 may be based at the upper and outer edges of the side plates 12, 14. Having the base plate contacting the four fixed references 16 of the side plate, while maintaining the vertical force, the adjustable references 18, attached to the side plates 12, 14 are moved towards the base plate 10, making these parts contact the bottom surface of the base plate 10 and hence establishing an 8-point contact between the base plate 10 and the side plates 12, 14. This stage of the assembly process is shown in FIGS. 2A and 2B.

Once the 8-point contact has been established, the base plate 10 can be fixed to the side plates 12, 14, e.g. by screws, rivets, welding or the like, and the side edge 10d of the base plate can be closed, e.g. by rivets, screws, welding or the like, and hence be "frozen" in its current position and alignment relative to the side plates 12, 14. As a result of the assembly process, all isostatic joint can be generated between the base plate 10 and the side plates 12, 14, with virtually no twist of the base plate. Further details of this process and of the assembly are described with reference to the following drawings.

Figure 3:
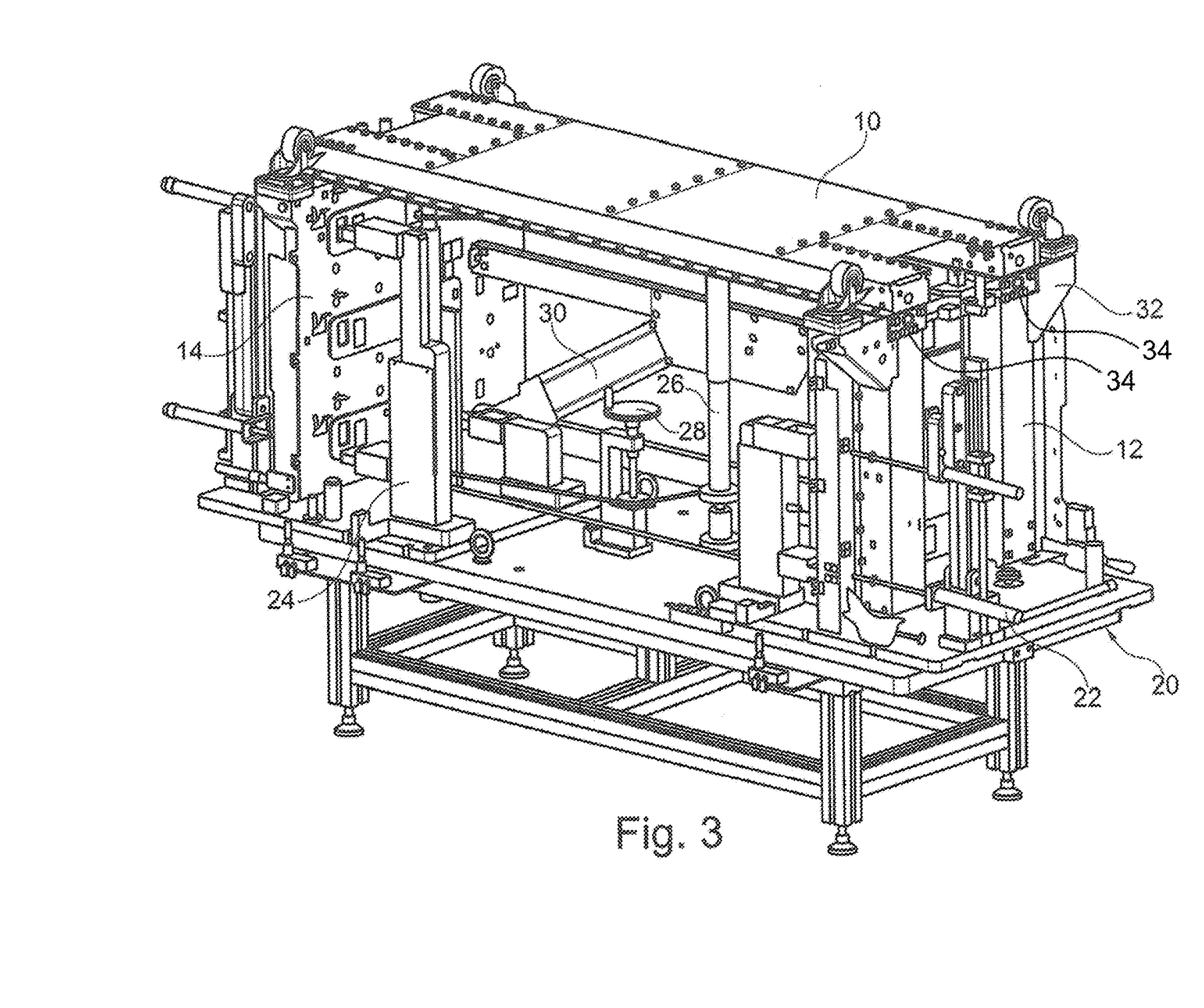
FIG. 3 shows an example of parts of a large format media handling system during assembly, held in an assembly tool.

FIG. 3 shows an example of an assembly jig 20 for positioning and aligning the side plates 12, 14 in order to ensure that the base plate 10 is perfectly horizontally aligned when it has been attached to the side plates 12, 14, as described above. While the details of the assembly jig 20 are not relevant to this disclosure, just as a matter of example, the assembly jig 20 comprises horizontal and vertical alignment rods and columns 22, 24, 26 and an adjustment mechanism 28. Before mounting the base plate 10 to the side plates 12, 14, the side plates 12, 14 are positioned in the assembly jig 20, as shown in FIG. 3, for example. When properly positioned and aligned, the four fixed references 16 of the side plates 12, 14 will all lie within one and the same horizontal plane to accommodate the base plate 10 thereon. As shown in FIG. 3 and the following drawings, the fixed references 16 can be provided by linear sections of the inner edge at the end face of the side plates 12, 14, and the movable references 18 can be provided by wedges 34 located adjacent to the outer edge near the end face of the side plates 12, 14 facing the base plate 10.

FIG. 3 further shows that the side plates 12 may comprise enforcing ribs and further structural components. The supporting structure provided by the side plates 12, 14 further can be enforced by transverse beams 30, giving the overall assembly additional rigidity. FIG. 3 further shows that wheels 32 can be attached to the side plates 12, 14.

Figure 4:
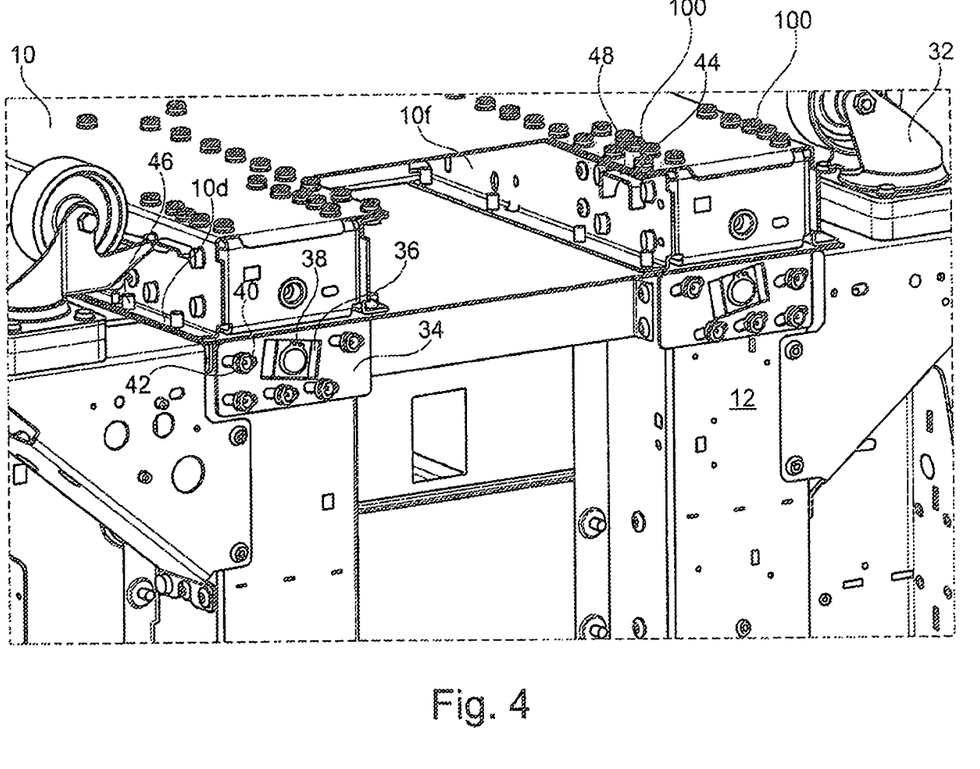
FIG. 4 shows an enlarged view of a part of FIG. 3 to illustrate some details of the assembly.

From FIGS. 3 and 4, it further may be recognized that the base plate 10, in addition to the closed profile schematically shown in FIG. 2B, may include additional enforcement beams or other structures to increase rigidity and strength of the base plate 10.

FIG. 4 shows an enlarged detailed view, illustrating how the adjustable references 18 are adjusted to rest against the contacting bottom surface of the base plate 10 and how the base plate 10 is fixed to one of the side plates 12. In the present example, the adjustable references 16 comprise wedges 34 which are attached to outer side faces of the side plates 12, 14 and which can be moved sideways so as to impart a slight movement (in the drawing upwards) towards the base plate 10. The example of the wedges 34 shown comprises a number of longitudinal holes 36, 40, a guide element 38 and a number of fixing elements 42, such as screws, clamps or the like. When the wedges 34, used as adjustable references, are to be positioned against the contacting side of the side plate 10, the screws and other fixing elements 38, 34 will be loosened and the wedges 34 will be moved sideways and hence also upwards (as seen in the drawing) so that their longitudinal edges facing the contacting side of the base plate 10 come to rest against the base plate. Once contact has been established between the upper edges of the wedges 34 and the base plate, the screws or other fixing elements will be closed. In this example, screws 42 are used for fixing the wedge 34 to the side plate 12 whereas reference number 38 designates a guide element for controlling the lateral and vertical movement of the wedge 34. Guide element 38 may be implemented by a shaft that also can support vertical forces/loads coming from the side plates against the base plate.

FIG. 4 further shows how the side plate 12 can be fixed to the base plate 10. The side plate 12 comprises projections 12a, shown in FIG. 1. These projections are inserted through respective holes (not shown) in the contacting side of the base plate 10 and then can be fixed to an inner profile 10f of the base plate 10 by screws 44 or other fastening means. In the example shown, an additional U-shaped profile 48 is inserted through the extensions 12a and the profile 10f of base plate 10 and it is tightened throughout screws 100 preloading the contact between the planar top shell of base plate and the side plate references, in addition to the screws 44, providing a press fit between the side plate 12 and the base plate 10. This ensures that there is no clearance between the base plate 10 and the side plate 12 which could corrupt the alignment achieved in the previous alignment steps.

FIG. 4 further, on the left-hand side, shows the initially open edge 10d of the base plate 10 which can be closed by rivets 49 or other fastening means, once the base plate has been mounted to the side plates 12 and well referenced without inducing any twist or elastic deformation to the entire structure.

Figure 5:
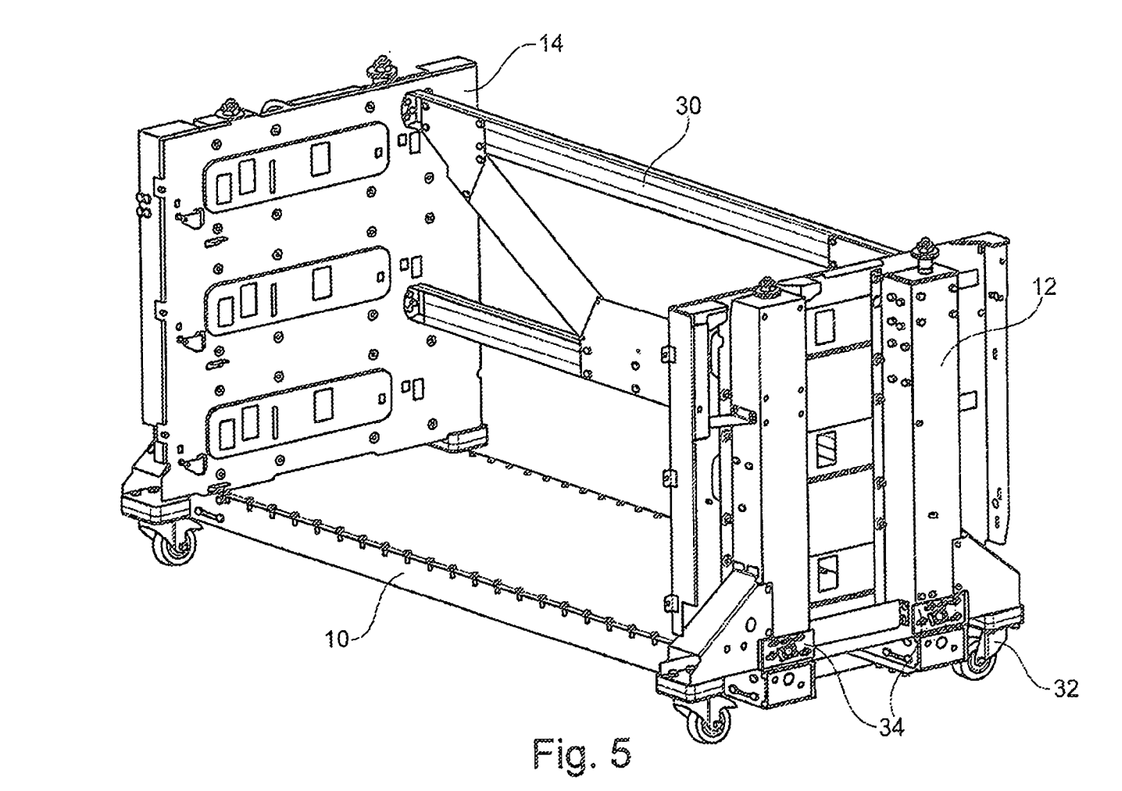
FIG. 5 shows a similar configuration as FIG. 3, after the assembly tool has been removed.

FIG. 5 shows an example of the assembly comprising the base plate 10 and the side plates 12, 14, after they have been aligned relative to each other and fixed and after the assembly jig 20 shown in FIG. 3 has been removed. Once this assembly has been completed, it is turned upside down so that the baseplate 10 together with the side plates 12, 14 can form a base support structure or mounting platform for a large format media handling system, such as a large format printer. Due to the precise alignment of the side plates 12, 14 in the mounting jig and the precise alignment of the base plate 10 relative to the side plates 12, 14, using eight reference points, the base support structure shown in FIG. 5 can provide a highly accurate mounting platform and support for mounting any sub-systems of the large format media handling system. The closed shape of the base plate 10 in combination with rigid side plates 12, 14 and the multiple contact points between the base plate 10 and the side plates 12, 14 provide an isostatic joint of high structural stiffness. Hence superior dimensional accuracy is achieved which is good enough to enable, for example, IQ (image quality) resolutions equivalent to those reached by table-top size design jet printers or similar size media handling systems. The assembly, nevertheless, manages heavy subsystems and gives a good reference interface for each subsystem assembled on that structure. High dimensional accuracy can be achieved without having to post-machine references or performing other post-adjustments, i.e. adjustments after assembly of the base plate and side plates.

Figure 6:
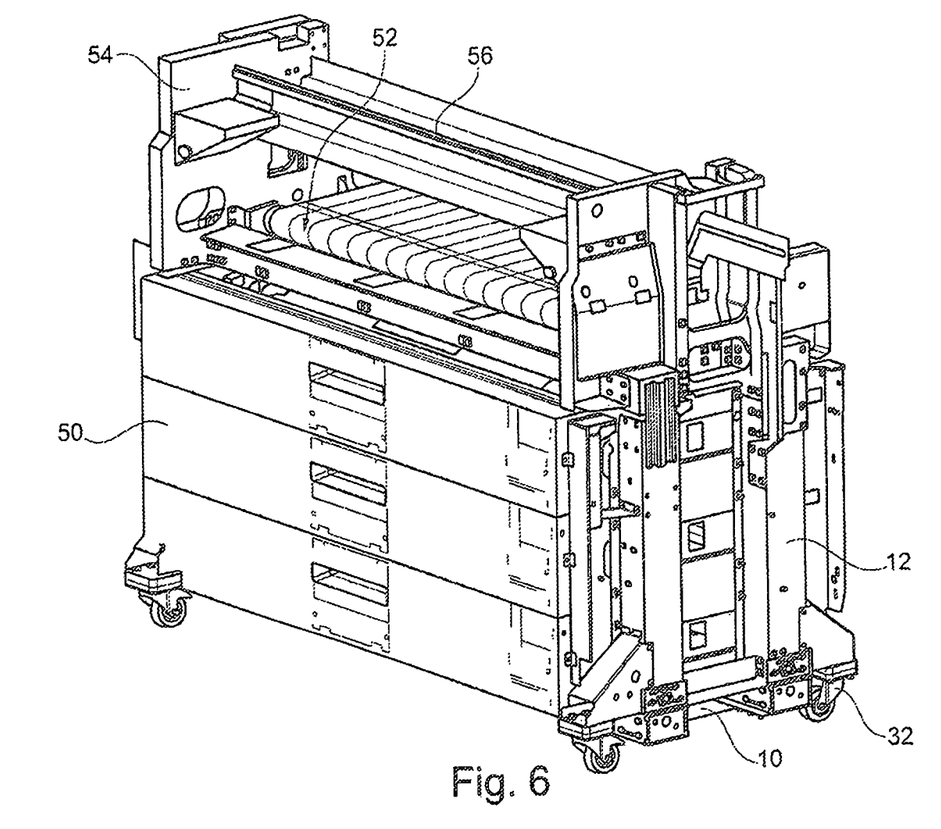
FIG. 6 shows an example of a semi-assembled large format printer which is built on the assembly shown in FIG. 5.

FIG. 6 shows an example of a partly assembled large format printer, based on the structure shown in FIG. 5. In the example shown in FIG. 6, the following sub-structures are mounted on the side plates: media input drawers 50; a vacuum platen system 52, including modular vacuum platens and vacuum belts; and a frame structure 54, 56 for supporting a carriage rod and printing carriage or a pen array printbar (not shown) for scanning over the print zone.

Figure 7:
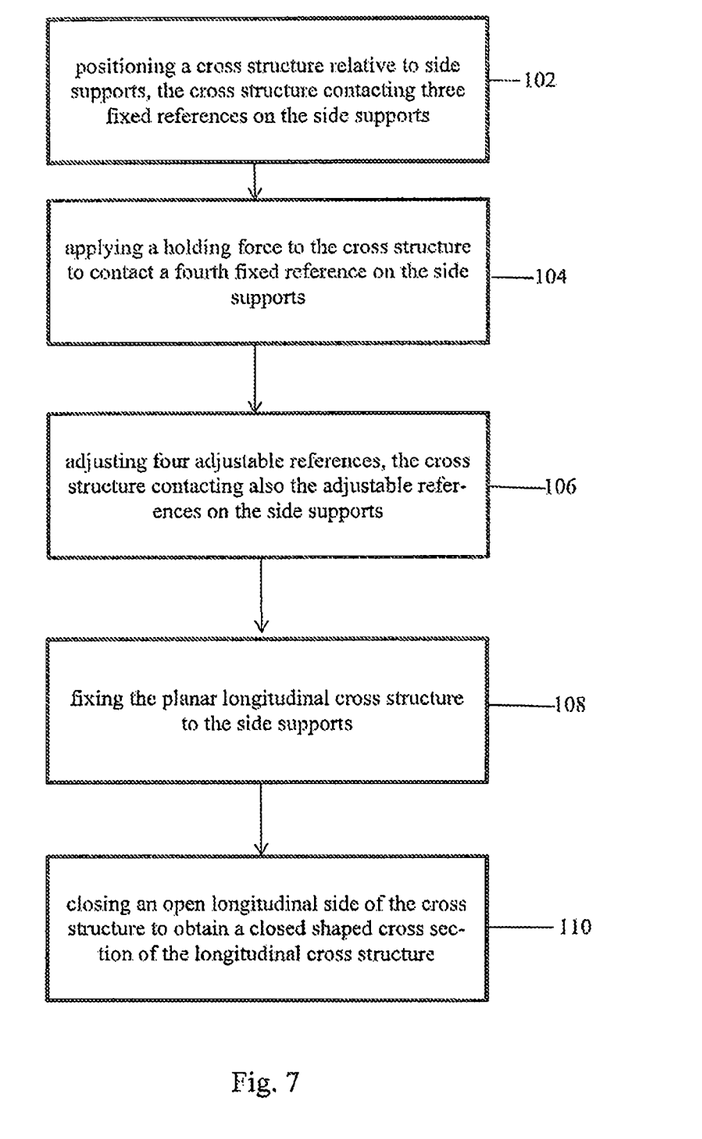
FIG. 7 shows a flow diagram of an example of a method of providing an assembly of a large format media handling system.

FIG. 7 shows an example of method of providing an assembly of a large format media handling system. The method comprises positioning 102 a cross structure relative to side supports, the cross structure contacting three fixed references on the side supports. As described, the cross structure can be a base plate 10 and the side supports can be side plates 12, 14 of a large format printer. Further, the side supports can be mounted in an assembly toot, as shown and described above. Once the cross structure has been positioned on the side supports, a holding force is applied to the cross structure to contact a fourth fixed reference on the side supports; see 104. In a next step 106, four adjustable references provided in the side supports are adjusted so that the cross structure also contacts the adjustable references on the side supports. Once eight point contact has been established between the cross structure and the side supports, the planar longitudinal cross structure is fixed to the side supports; see 108. In a final step 110, an open longitudinal side of the cross structure is closed to obtain a closed shaped cross section of the longitudinal cross structure and improve rigidity of the overall support structure.

The present disclosure hence proposes a method of providing an assembly of a large format media handling system, the assembly including a planar longitudinal cross structure, such as the base plate, and a support structure, the support structure including two side supports, such as the side plates, comprising a number of fixed references and at least one adjustable reference. The method comprises positioning the cross structure relative to the side supports whereby the cross structure contacts at least three of the fixed references on the side supports; adjusting the at least one adjustable reference whereby the cross structure also contacts the at least one adjustable reference on the side supports; and fixing the planar longitudinal cross structure to the side supports. In one example, there are two fixed references on each side support and two adjustable references on each side support. The adjustable references may be formed by wedges which are slidably attached to the side supports so that a lateral displacement to the wedges will make the wedges move in a vertical direction and contact the lateral cross structure.

In one example, the lateral cross structure has a generally closed shaped cross-section wherein, when positioning the cross structure relative to the side supports, the cross structure is open at one longitudinal side thereof and, after the cross structure has been fixed to the side supports, said open longitudinal side of the cross structure is closed.

Another example of this disclosure provides an assembly of a large format media handling system including a planar longitudinal cross structure and a support structure, such as the base plate, and a support structure including two side supports, such as the side plates, comprising a number of fixed references and at least one adjustable reference. The side supports are supported by the longitudinal cross structure at said references. In one example, the at least one adjustable reference is formed by a wedge element slidably attached to the support structure, and the side supports are fixed to the planar longitudinal cross structure with the cross structure in contact with all of the references.

In one example, the support structure comprises two fixed references at each side support and two adjustable references at each side support. During assembly, the cross structure allows for limited torsional movement within said structure to allow the cross structure to contact all four fixed reference points. To this end, in one example, the cross structure has a generally closed shape cross section but one longitudinal side of the cross structure is open during mounting the cross structure on the side supports and is closed only after the side supports have been fixed to the cross structure, in order to avoid distorting the structure and avoid introducing elastic and/or plastic deformations to the structure.

In one example, the assembly provides a mounting platform of a large format printer or other large format media handling device and the side supports comprise side plates supporting sub-structures of said printer or other media handling device.

In a further example, the present disclosure provides a large format printer including a planar longitudinal base plate and two side plates, the side plates comprising four fixed references and four adjustable references wherein the side plates are supported by the longitudinal base plate as said references. The adjustable references are formed by wedge elements slidably attached to the support structure, and the side plates are fixed when the longitudinal base plate is in contact with all of the references. The side plates may support printer sub-structures, including at least one of: a print platen, a printhead assembly, a print media transport system, a print media holder, a print media input section, and a print media output section, the printer sub-structures being aligned horizontally by said side plates and maintaining the high accuracy without introducing: paper misalignments or image quality defects.

LIST OF REFERENCE NUMERALS

10 base plate
12, 14 side plates
16 fixed references
18 adjustable references
12a mounting extension
10d open edge
20 mounting jig
22, 24, 26 mounting columns/rods
28 adjustment mechanism
30 cross bar
32 wheels
34 wedge
36, 40 adjustment wholes
38 guide
42 screws
44 screws
46 rivet
48 fitting structure
50 drawers
52 print platen
54, 56 cross structure

The invention claimed is:

1. A method of providing an assembly of a media handling system, the assembly including a planar longitudinal cross structure and a support structure, the support structure comprising at least three fixed references and at least one adjustable reference disposed among two side supports of the support structure, the method comprising:

positioning the cross structure relative to the side supports of the support structure, whereby the cross structure contacts the at least three fixed references on the side supports;

adjusting the at least one adjustable reference while the cross structure contacts the at least three fixed references, whereby the cross structure also contacts the at least one adjustable reference on the side supports; and fixing the planar longitudinal cross structure to the side supports.

2. The method of claim 1, wherein positioning the cross structure relative to the side supports comprises:

positioning the cross structure relative to the side supports whereby the cross structure contacts three of the fixed references on the side supports; and applying a compression force to the cross structure to also contact a fourth fixed reference on the side supports, wherein two fixed reference points are located on a first one of the side supports and two fixed reference points are located on the other one of the side supports.

3. The method of claim 2, wherein adjusting the at least one adjustable reference comprises adjusting two adjustable references located on the first one of the side supports and two adjustable references located on the other one of the side supports, whereby the cross structure contacts all four adjustable references.

4. The method of claim 2, further comprising closing an open longitudinal side of the cross structure after fixing the cross structure to the side support so as to form a closed shaped cross section, wherein the cross structure is initially open along the longitudinal side when positioning the cross structure relative to the side supports and applying the compression force.

5. The method of claim 1, wherein adjusting the at least one adjustable reference comprises moving a wedge which is slidably attached to the support structure.

6. The method of claim 1, wherein positioning the cross structure relative to the side supports of the support structure comprises:

vertically positioning the side supports in a positioning tool, each side support having two fixed inner contact lines and two adjustable outer contact lines;

positioning the cross structure on the side supports thereby contacting the at least three fixed references; and applying a holding force to the cross structure so that the cross structure contacts a fourth fixed reference, the three fixed references and the fourth fixed reference providing the fixed inner contact lines; and adjusting the at least one adjustable reference comprises:

moving four wedge structures, which are attached to the side supports, relative to the side supports to bring them into contact with the cross structure, each wedge structure providing one adjustable outer contact line, wherein after fixing the cross structure to the side supports, there is contact between the cross structure and the side supports along the fixed inner contact lines and the adjustable outer contact lines.

7. The method of claim 6, further comprising: turning the assembly of the cross structure and the support structure upside down after having been fixed to each other to provide a base plate and side plates of a large format printer.

8. An assembly of a large format media handling system, including:

a planar longitudinal cross structure; and a support structure, the support structure comprising a number of fixed references and at least one adjustable reference disposed among two side supports of the support structure, wherein the side supports are supported by the longitudinal cross structure at the number of fixed references and the at least one adjustable reference, wherein the side supports are fixed to the planar longitudinal cross structure such that the cross structure is in contact with all of the fixed references and the at least one adjustable reference, and wherein the cross structure is a mounting base plate of a large format printer and the side supports comprise side plates to support substructures of a large format printer.

9. The assembly of claim 8, wherein the side supports comprise at least four fixed reference points, and wherein the cross structure allows for torsional movement during assembly to contact said at least four fixed reference points.

10. The assembly of claim 9, wherein:

the cross structure has a generally closed shaped cross section; and a longitudinal side of the cross structure is open when fixing the side supports to the cross structure, and is closed after the side supports have been fixed to the cross structure.

11. The assembly of claim 8, wherein at least four wedges are slidably attached to the side supports, the four wedges to provide four adjustable reference points.

12. The assembly of claim 8, wherein eight contact lines are provided by four fixed references and four adjustable references between the cross structure and the support structure.

13. A large format printer, including:

a planar longitudinal base plate; and two side plates, each of the two side plates comprising two fixed references and two adjustable references, wherein the side plates are supported by the longitudinal base plate at said references; and wherein:

the adjustable references are formed by wedge elements slidably attached to the side plates; and the side plates are fixed to the longitudinal base plate in contact with all of the references.

14. The large format printer of claim 13, wherein the side plates support printer substructures including at least one of: a print platen, a print head assembly, a print media transport system, a print media holder, a print media input section, and a print media output section, the printer substructures being aligned horizontally by said side plates without inducing any distortion between them or without inducing any elastoplastic deformation between them.

\* \* \* \* \*

UNITED STATES PATENT AND TRADEMARK OFFICE
CERTIFICATE OF CORRECTION

PATENT NO. : 10,052,894 B2
APPLICATION NO. : 15/312631
DATED : August 21, 2018
INVENTOR(S) : Ricardo Sanchis Estruch et al.

Page 1 of 1

It is certified that error appears in the above-identified patent and that said Letters Patent is hereby corrected as shown below:

On the Title Page

In Column 1, item (72), Applicants, Line 3-6, after "HEWLETT-PACKARD DEVELOPMENT COMPANY, L.P., Houston, TX (US);" delete "Ricardo Sanchis Estruch, Barcelona (ES); Joaquim Brugue Garvi, Barcelona (ES); Pol Morral, Sant Cugat del Valles (ES)".

In the Claims

In Column 7, Line 29, Claim 4, delete "support" and insert -- supports --, therefor.

Signed and Sealed this
First Day of January, 2019

Andrei Iancu
*Director of the United States Patent and Trademark Office*